US012565781B2

(12) United States Patent
Saadie

(10) Patent No.: US 12,565,781 B2
(45) Date of Patent: Mar. 3, 2026

(54) FORMWORK WALL PANEL AND FORMWORK ASSEMBLY

(71) Applicant: FEF GROUP PTY LTD, Glenwood (AU)

(72) Inventor: Michael Saadie, Glenwood (AU)

(73) Assignee: FEF GROUP PTY LTD, Glenwood (AU)

( * ) Notice: Subject to any disclaimer, the term of this patent is extended or adjusted under 35 U.S.C. 154(b) by 0 days.

(21) Appl. No.: 18/144,472

(22) Filed: May 8, 2023

(65) Prior Publication Data

US 2023/0272630 A1 Aug. 31, 2023

Related U.S. Application Data

(63) Continuation of application No. 17/257,146, filed as application No. PCT/AU2019/050702 on Jul. 3, 2019, now Pat. No. 11,686,112.

(30) Foreign Application Priority Data

Jul. 3, 2018 (AU) ................................ 2018902416

(51) Int. Cl.
*E04G 17/14* (2006.01)
*E04B 2/86* (2006.01)
(Continued)

(52) U.S. Cl.
CPC ............ *E04G 17/14* (2013.01); *E04B 2/8641* (2013.01); *E04B 2002/867* (2013.01); (Continued)

(58) Field of Classification Search
CPC ....... E04G 17/14; E04G 11/06; E04G 13/068; E04B 2/8641; E04B 2002/867; E04B 2002/8676; E04B 2002/8688; E04B 2/8629; E04B 2/8635; E04B 2/8652; E06B 1/003; E06B 3/4609; E06B 1/02; E06B 1/60; E04C 2/3405
See application file for complete search history.

(56) References Cited

U.S. PATENT DOCUMENTS 1,226,214 A * 5/1917 Hopkins .................. E04B 2/86 52/421
3,397,496 A 8/1968 Sohns
(Continued)

FOREIGN PATENT DOCUMENTS

CA 3034735 A1 3/2018
DE 2507577 A1 8/1975
(Continued)

*Primary Examiner* — Omar F Hijaz
(74) *Attorney, Agent, or Firm* — Thomas Joseph

(57) ABSTRACT

In a one aspect there is disclosed a formwork wall panel (10) having an operative inner surface (12) to face towards an inner space to be filed with building material and an opposing operative outer surface (14) having a surface finishing component (16) secured thereto. The operative inner surface (12) of the formwork wall panel (10) includes a brace coupling formation (18) operatively adapted to engage a wall panel coupling formation (20) of a brace (22) operatively extending between the formwork wall panel (10) and an opposing second formwork wall panel.

1 Claim, 11 Drawing Sheets

(51) Int. Cl.

| | |
|---|---|
| ***E04G 11/06*** | (2006.01) |
| ***E06B 1/00*** | (2006.01) |
| ***E06B 3/46*** | (2006.01) |

(52) U.S. Cl.

CPC ................. *E04B 2002/8676* (2013.01); *E04B 2002/8688* (2013.01); *E04G 11/06* (2013.01); *E06B 1/003* (2013.01); *E06B 3/4609* (2013.01)

(56) References Cited

U.S. PATENT DOCUMENTS

| | | | | |
|---|---|---|---|---|
| 4,149,349 | A | 4/1979 | Nilsen et al. | |
| 4,332,119 | A | 6/1982 | Toews | |
| 5,740,648 | A | 4/1998 | Piccone | |
| 6,167,669 | B1 | 1/2001 | Lanc | |
| 6,212,845 | B1 | 4/2001 | De Zen | |
| 6,247,280 | B1 | 6/2001 | Grinshpun et al. | |
| 7,703,248 | B2 | 4/2010 | Dincel | |
| 9,091,089 | B2 | 7/2015 | Pfeiffer | |
| 10,287,773 | B2 * | 5/2019 | Taleb | E04B 2/8629 |
| 11,466,452 | B2 * | 10/2022 | Pszczonka | E04G 9/05 |
| 11,591,794 | B2 * | 2/2023 | Piccone | E04B 2/8652 |
| 2005/0016103 | A1 | 1/2005 | Piccone | |
| 2006/0005497 | A1 * | 1/2006 | Foell | E04G 11/06<br>52/589.1 |
| 2007/0193169 | A1 | 8/2007 | Emblin | |
| 2014/0318062 | A1 | 10/2014 | Richardson et al. | |
| 2015/0275531 | A1 * | 10/2015 | Alcala Ordaz | E04B 2/8658<br>249/189 |

FOREIGN PATENT DOCUMENTS

| | | | | |
|---|---|---|---|---|
| GB | 696260 | A | 8/1953 | |
| GB | 1573888 | A | 8/1980 | |
| GB | 2323115 | A | 9/1998 | |
| GB | 2326173 | A | 12/1998 | |
| JP | 2006189383 | A | 7/2006 | |
| KR | 101361959 | B1 | 2/2014 | |
| WO | 03031740 | A1 | 4/2003 | |
| WO | 2008128275 | A1 | 10/2008 | |
| WO | WO-2014121337 | A1 * | 8/2014 | E04B 2/8635 |
| WO | 2015066758 | A1 | 5/2015 | |

* cited by examiner

FORMWORK WALL PANEL AND FORMWORK ASSEMBLY

CROSS REFERENCE TO RELATED APPLICATIONS

The present application is a U.S. national stage application of PCT International Application No. PCT/AU2019/050702, filed Jul. 3, 2019, and published as PCT Publication WO/2020/006601 on Jan. 9, 2020, which claims priority to Australian Application No. AU 2018902416, filed on Jul. 3, 2018. The disclosures of all the foregoing applications are hereby incorporated by reference in their entirety into the present application.

FIELD

The present invention relates to a formwork wall panel and a formwork assembly, in particular but not exclusively, a formwork wall panel and formwork assembly operatively adapted to construct a wall having an interior space for receiving poured concrete during construction of a building. In another aspect the invention concerns a window framing assembly. In yet a further aspect the invention concerns a brace assembly for supporting a formwork assembly.

BACKGROUND

In the construction industry formwork is used to provide temporary or permanent molds into which concrete or building materials are poured into during the construction of a building. There are various types of formwork. Known types of formwork include formwork structures constructed on site from timber and plywood. Another type of formwork is an engineered system built from prefabricated modules having a metal frame. Other types of formwork include re usable interlocking modular plastic units or insulating concrete forms which are assembled on site and will remain in place after the concrete has cured.

Modular plastic formwork units typically comprise two parallel, spaced apart wall panels held together with connectors which extend between the wall panels. The spaced apart wall panels define an interior space into which concrete can be poured. Once the concrete has set the wall panels are removed. One such system is described in WO 2014/121337 which discloses a formwork system with two spaced apart wall members having opposed inner surfaces and connectors. The connectors are adapted to engage connecting elements integral with or mounted onto each wall member inwards of the outer surfaces of the wall members to hold and retain the wall members in a spaced apart configuration.

Various prior art formwork systems are known. WO 03/031740, for example, concerns an elongate building element to form a series of walls. The building elements each include longitudinally extending flanges that snap-engage with longitudinally extending grooves in the next adjacent element. A wall is constructed by joining the elements in a direction transverse to the general direction of extension. The wall is filled with concrete as required. WO 2015/066758 describes a building formwork component comprising first and second spaced apart sidewalls having one or more webs extending therebetween. Each sidewall comprises a flange extending inwardly along a first edge of the sidewall such that an outer surface of the flange forms a ramp surface and a groove extending along an opposing second edge of the sidewall. The component may be coupled to a like component by relative movement of the components towards each other whereby the flanges are received in respective grooves of the like component. The ramp surfaces facilitate coupling by engaging respective second edges of the like component to move the second edges and/or ramp surfaces for engagement of the flanges in the groove.

U.S. Pat. No. 3,397,496 describes an interlocking panel unit for building a house. The panel comprises a low density plastic foam core sheet and resin reinforced glass fibre face skins on the inner and outer surface thereof to define a laminated panel unit having upper, lower and side edge surfaces. The interlocking panel further includes a mating panel side edge surface locking means for panel units in which each of the side edges has a resin reinforced glass fibre edge skin anchored to the inner surfaces of each of the face skins. One of the side edges comprises a female side edge and the other a male side edge. The female edge has an outwardly extending tongue means formed jointly of edge skin and the inner face skin and, on the outer face skin, a groove means extending parallel to and set back of the edge skin. The female edge further includes a trough means formed on the outer skin between the groove means and edge skin. The male edge includes an outwardly extending generally flat planar locking arm member with a downwardly directed clip leg for engaging the groove on the female edge with the locking member passing over and covering the trough means.

Persons familiar with the construction of buildings will be aware that windows are installed within widow frames located in window cavities of a building. Typically, windows are installed while there is still much structural work required to be undertaken. As such windows are often broken, damaged or covered in dirt resulting from construction work. It would accordingly be beneficial if the windows of a building could be installed towards the end of the construction process to avoid damage to windows necessitating replacement expense or the cost of having construction dirt removed.

OBJECT

It is an object of the present invention to provide an alternative formwork assembly for use in the construction industry. It is another object of the invention to provide an alternative window framing assembly. It is yet another object of the invention to provide an alternative brace assembly for supporting a formwork assembly.

SUMMARY

In a first aspect there is disclosed a formwork wall panel having an operative inner surface, to face towards an inner space to be filed with building material, and an opposing operative outer surface having a surface finishing component is secured thereto, wherein the operative inner surface of the formwork wall panel includes a brace coupling formation operatively adapted to engage a wall panel coupling formation of a brace operatively extending between the formwork wall panel and an opposing second formwork wall panel.

Preferably the surface finishing component is produced from metal, marble or an aluminum panel having a honeycomb structure.

Preferably the surface finishing component is a surface finishing panel which is embedded within the operative outer surface.

Preferably the operative inner surface of the formwork wall panel includes a brace coupling formation operatively adapted to engage a wall panel coupling formation of a brace operatively extending between the formwork wall panel and an opposing second formwork wall panel.

Preferably the brace coupling formation defines a panel slot arrangement operatively adapted to slidably engage a slider member of the wall panel coupling formation of the brace.

Preferably the slider member is connected to a brace panel of the brace.

Preferably the brace panel includes concrete cavities to facilitate concrete flow across the brace panel.

Preferably the panel slot arrangement includes a first and second panel slot respectively adapted to slidably engage a first and second slider member of the wall panel coupling formation of the brace.

Preferably the first and second slider members of the wall panel coupling formation are connected on opposing sides of a transverse slider connector.

Preferably the brace coupling formation includes a first outer coupling member, a second outer coupling member and a central coupling member located between the first outer coupling member and the second outer coupling member, the first outer coupling member, second outer coupling member and the central coupling member extending outwardly from the operative inner surface of the formwork wall panel.

Preferably (i) the first outer coupling member and the central coupling member define the first panel slot and (ii) the central coupling member and the second outer coupling member define the second panel slot.

Preferably the first outer coupling member includes (i) a first coupling member stem which extends outwardly from the operative inner surface of the formwork wall panel and (ii) a transverse first coupling member flange which extends towards the central coupling member.

Preferably the first outer coupling member stem includes a transverse first outer coupling member rib outwardly extending from the first coupling member stem away from the central coupling member, in use the first outer coupling member rib being adapted to engage a first slot in a services channel located adjacent the operative inner surface of the formwork wall panel.

Preferably the first coupling member flange includes a transverse first coupling member lip extending towards the operative inner surface of the formwork wall panel.

Preferably the second outer coupling member includes (i) a second coupling member stem which extends outwardly from the operative inner surface of the formwork wall panel and (ii) a transverse second coupling member flange which extends towards the central coupling member.

Preferably the second outer coupling member stem includes a transverse second outer coupling member rib outwardly extending from the second coupling member stem away from the central coupling member, in use the second outer coupling member rib being adapted to engage a second slot in the services channel located adjacent the operative inner surface of the formwork wall panel.

Preferably the second coupling member flange includes a transverse second coupling member lip extending towards the operative inner surface of the formwork wall panel.

Preferably the central coupling member includes (i) a central coupling member stem which extends outwardly from the operative inner surface of the formwork wall panel, and (ii) a transverse central coupling member flange.

Preferably the central coupling member flange includes at one end a transverse first lip extending towards the operative inner surface of the formwork wall panel and at an opposite second end a transverse second lip extending towards the operative inner surface of the formwork wall panel.

Preferably the first panel slot of the brace coupling formation includes (i) a first area defined by the first coupling member stem, the first coupling member flange and the first coupling member lip, and (ii) a second area defined by the central coupling stem, the central coupling member flange and the transverse first lip.

Preferably the second panel slot of the brace coupling formation includes (i) a first area defined by the second coupling member stem, the second coupling member flange and the second coupling member lip, and (ii) a second area defined by the central coupling stem, the central coupling member flange and the second lip and the operative inner surface.

Preferably the first slider member includes a first slider stem which extends outwardly from the slider connector.

Preferably the first slider stem is attached to a transverse first slider base, the first slider base having two opposing first slider base lips.

Preferably the first panel slot includes a first space formed between the first coupling member lip of the first outer coupling member and the first lip of the central coupling member, the first space adapted to allow the first slider stem to pass therethrough.

Preferably the first panel slot includes (i) a first area defined by the first coupling member stem, the first coupling member flange and the first coupling member lip, and (ii) a second area defined by the central coupling member stem, the transverse central coupling member flange and the first lip.

Preferably one of the first slider base lips is located in the first area of the first panel slot and the other first slider base lip is located within the second area of the first panel slot.

Preferably the second slider member includes a second slider stem which extends outwardly from the slider connector.

Preferably the second slider stem is attached to a transverse second slider base, the second slider base having two opposing second slider base lips.

Preferably the second panel slot includes a first space formed between the second coupling member lip of the second outer coupling member and the second lip of the central coupling member, the first space adapted to allow the second slider stem to pass therethrough.

Preferably the second panel slot includes (i) a first area defined by the second coupling member stem, the second coupling member flange and the second coupling member lip, and (ii) a second area defined by the central coupling member stem, the transverse central coupling member flange and the second.

Preferably one of the second slider base lips is located in the first area of the second panel slot and the other second slider base lip is located within the second area of the second panel slot.

Preferably the formwork wall panel at one end includes a first joining formation and at second opposite end a second joining formation, the first and second joining formations operatively adapted to join the formwork wall panel to two adjacent formwork wall panels respectively located on opposite sides of the formwork wall panel.

Preferably the first joining formation includes a first joining stem outwardly extending from the operative inner surface of the formwork wall panel and a transverse male member outwardly extending from one side of the first joining stem.

Preferably the first joining stem includes a first transverse joining rib extending outwardly in a direction opposite to the male member.

Preferably the second joining formation includes a second joining stem outwardly extending from the operative inner surface of the formwork wall panel and a transverse female member outwardly extending from one side of the second joining stem.

Preferably the second joining stem includes a second transverse joining rib extending outwardly in a direction opposite to the female member.

Preferably the male member of the formwork wall panel is operatively adapted to be received and held by the female member of an adjacent formwork wall panel.

Preferably the male member includes a male gripping formation operatively associated with a complemental female gripping formation of the female member.

Preferably the male gripping formation includes male teeth operatively adapted to engage female gripping teeth providing the female gripping formation.

Preferably (i) the operative inner surface of the formwork wall panel, first joining stem and first transverse joining rib define a first flange opening, and (ii) the operative inner surface of the formwork wall panel, second joining stem and second transverse joining rib define a second opening, wherein the first flange opening of the formwork wall panel is adapted to hold a first flange of a panel joining member, and a second flange opening of the formwork wall panel is adapted to hold a second flange of a second panel joining member.

In a second aspect there is disclosed herein a formwork wall panel having an operative inner surface, to face towards an inner space to be filed with building material, and an opposing operative outer surface, wherein (i) the operative inner surface of the formwork wall panel includes a brace coupling formation operatively adapted to engage a wall panel coupling formation of a brace operatively extending between the formwork wall panel and an opposing second formwork wall panel, and (ii) the brace coupling formation defines a panel slot arrangement operatively adapted to slidably engage a slider member of the wall panel coupling formation of the brace.

In a third aspect there is disclosed herein a formwork assembly including a first wall panel operatively associated with an opposing, spaced apart second wall panel, operative opposing inner surfaces of the first and second wall panels defining a cavity to be filed with poured concrete, the first wall panel being produced from a polymer and having a surface finishing component secured to an operatively outer surface thereof.

In a fourth aspect there is disclosed herein a formwork assembly including a formwork wall panel having an operative inner surface, to face towards an inner space to be filed with building material, and an opposing operative outer surface, wherein (i) the operative inner surface of the formwork wall panel includes a brace coupling formation operatively adapted to engage a wall panel coupling formation of a brace operatively extending between the formwork wall panel and an opposing second formwork wall panel, and (ii) the brace coupling formation defines a panel slot arrangement operatively adapted to slidably engage a slider member of the wall panel coupling formation of the brace.

Preferably the formwork wall panel is a first formwork wall panel and the formwork assembly include a second formwork wall panel laterally spaced from the first formwork panel, wherein the brace coupling formation of the first formwork panel is connected to a brace coupling formation of the second formwork panel via a panel wall connector.

In another aspect there is disclosed herein a formwork cavity panel including: a first formwork wall panel having an operative inner surface, to face towards a first inner space to be filed with building material, and an opposing operative outer surface, wherein (i) the operative inner surface of the formwork wall panel includes a brace coupling formation operatively adapted to engage a wall panel coupling formation of a brace operatively extending between the first formwork wall panel and an opposing formwork wall panel; and a second formwork wall panel having an operative inner surface, to face towards an inner space to be filed with building material, and an opposing operative outer surface, wherein (i) the operative inner surface of the second formwork wall panel includes a brace coupling formation operatively adapted to engage a wall panel coupling formation of a brace operatively extending between the second formwork wall panel and an opposing formwork wall panel, wherein the outer surface of the first formwork wall panel is spaced apart from the outer surface of the second formwork wall panel to form an insulation space, the first formwork wall panel being secured to the second formwork wall panel via spacer connectors which extend across the insulation space.

In yet a further aspect there is disclosed herein a window frame member for operative location within a window cavity of a wall, the window frame member including (i) a window cavity side, operatively facing a wall within which the window frame member is placed, and (ii) a window side, operatively facing a window pane held by the window frame member, the window frame member including at least one window frame track operatively adapted to be engaged by an elongate cavity member, the cavity member operatively extending into a wall cavity of the wall so as to hold the window frame member in position.

Preferably the window frame member includes a plurality of window frame tracks to provide alternative positions for location of the cavity member.

Preferably the window frame member includes a window attachment member outwardly extending from the window side of the window frame member.

Preferably the window frame member includes a shadow line bar track operatively adapted to engage a shadow line bar.

Preferably the window frame member includes a plurality of longitudinally extending support channels.

Preferably the window frame member is an operative upper window frame member and a number of the longitudinally extending support channels includes a window frame bracing formation.

In yet a further aspect there is provided a wall support assembly operatively adapted to support formwork to be filled with concrete, the wall support assembly including a wall brace assembly, the wall brace assembly including a wall brace upright and a wall brace base, the wall brace assembly including a cross-brace extending between the wall brace upright and the wall brace base, the cross-brace including an outer brace member and an inner brace member which are telescopically coupled so as to adjust the length of the cross-brace.

Preferably the cross-brace includes an adjustment configuration for adjusting the length of the cross-brace.

Preferably the adjustment configuration includes an outwardly extending pin on the inner brace member operatively located within an elongate slot of the outer brace member.

Preferably the outer brace member includes an outer threaded portion.

Preferably the threaded portion includes threaded adjustment members operatively adapted to engage the pin so to adjust the cross-brace to a desired length.

Preferably the wall support assembly includes an upright laterally spaced apart from the wall brace upright.

Preferably the wall brace upright is telescopically coupled to the upright via a cross member so that the distance between the wall brace upright and the upright can be adjusted.

Preferably the wall brace assembly is collapsible, wherein the wall brace upright and the cross-brace are sized so that when the brace assembly is collapsed the wall brace upright and the cross-brace fit within the wall brace base.

BRIEF DESCRIPTION OF THE DRAWINGS

Preferred embodiments of the invention will be described hereinafter, by way of examples only, with reference to the accompanying drawings wherein.

DESCRIPTION OF PREFERRED EMBODIMENTS

Figure 1:
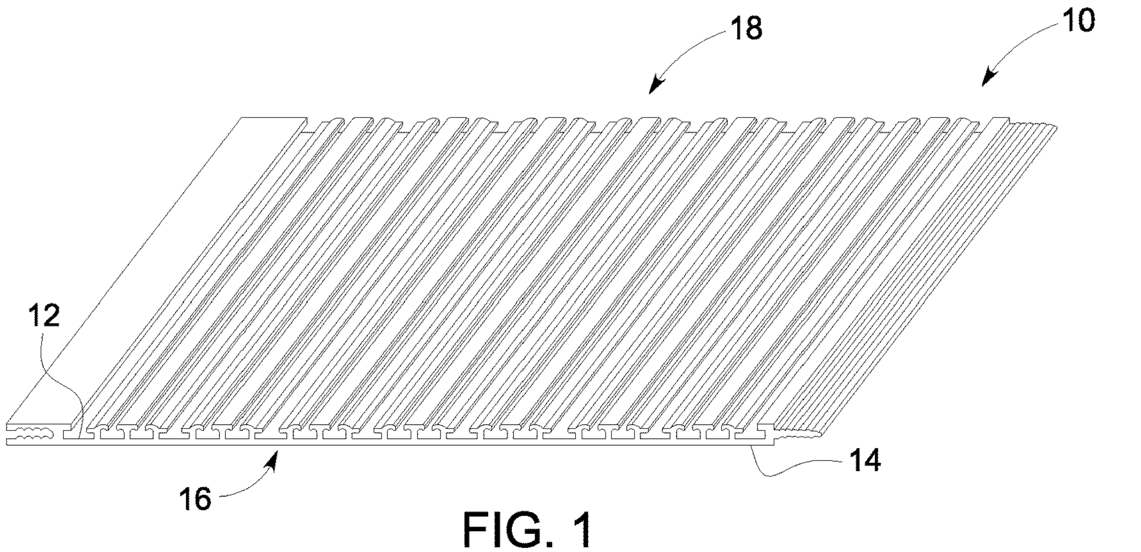
FIG. 1 is a schematic perspective view a first embodiment formwork wall panel.
Figure 2:
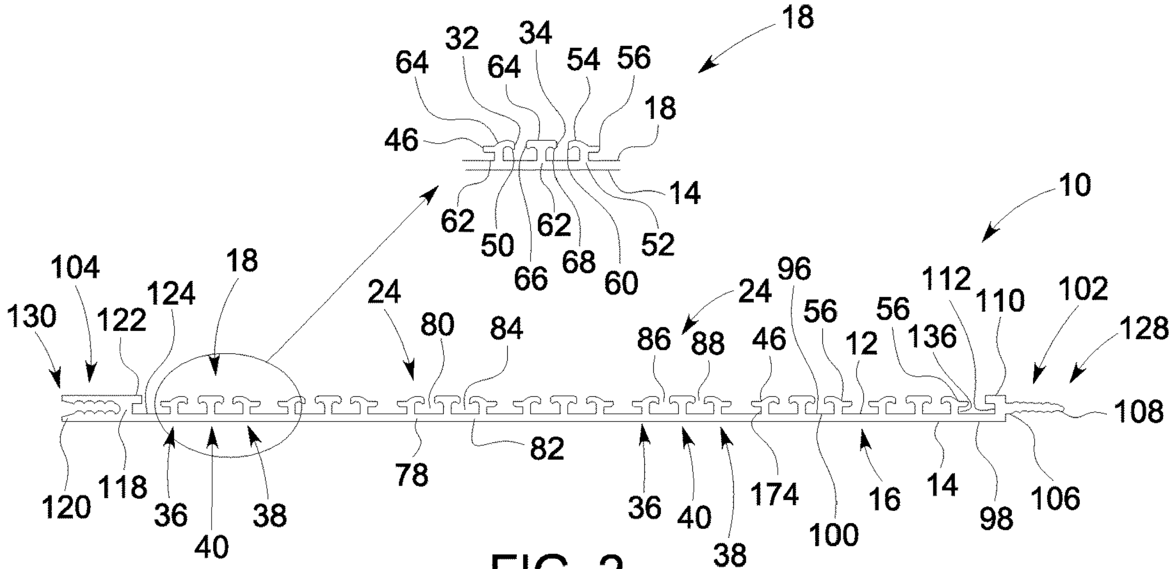
FIG. 2 is a schematic top view of the formwork wall panel of FIG. 1.

FIGS. 1 and 2 show an embodiment formwork wall panel 10 for use in constructing a formwork assembly to receive concrete during a building process. The formwork panel 10 includes an operative inner surface 12, to face towards a non-illustrated inner space to be filed with building material, and an opposing operative outer surface 14. The embodiment formwork wall panel 10 is produced from a polymer, here polyvinylchloride PVC, and has a surface finishing component 16 secured to the operative outer surface 14. By having a surface finishing component 16 in place, no further finishing is required to provide a formwork wall panel 10 with a finished appearance. It is envisaged that the surface finishing component 16 can be provided in a range of colors for different aesthetic appearances. It is further envisaged that the formwork wall panel 10 can, for example, be produced by placing a finishing component 16, typically a flat strip of colored material such a colored metal, inside a mold and have plastic molded onto the finishing component 16 to produce the formwork wall panel 10. The result of this is that surface finishing component 16 is embedded within the operative outer surface 14. In an alternative embodiment the surface finishing component 16 is produced from marble and the rest of the formwork wall 10 panel from aluminum. The marble finishing component 16 is secured to the operative outer surface 14 by way of an epoxy or equivalent adhesive. In a further alternative embodiment the surface finishing component 16 is provided in the form of a non-illustrated aluminum honeycomb panel.

Figure 3:
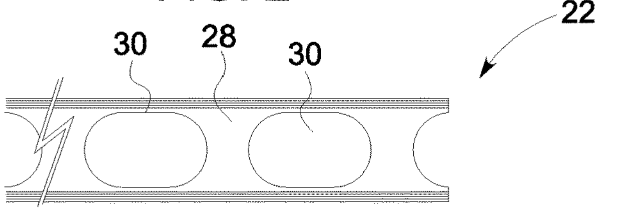
FIG. 3 is a schematic side view of a portion of an embodiment brace operatively adapted for attachment to the formwork panel of FIG. 1.
Figure 4:
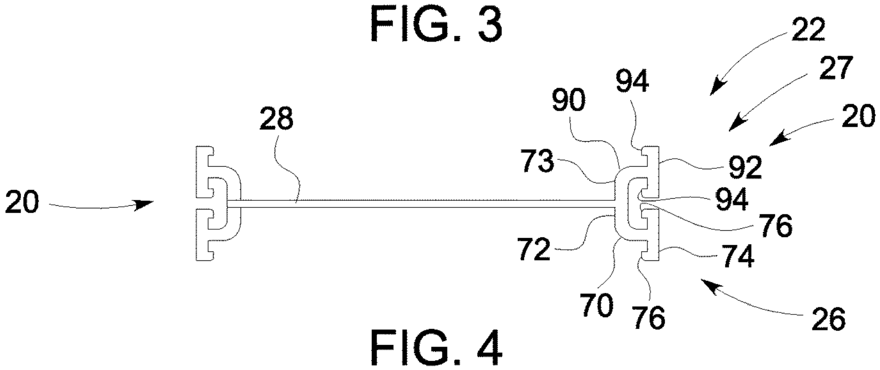
FIG. 4 is a schematic top view of the brace of FIG. 3.

The operative inner surface 12 of the formwork wall panel 10 includes a brace coupling formation 18 operatively adapted to engage a wall panel coupling formation 20 of a brace 22, shown in FIGS. 3 and 4. In use the brace 22 operatively extends between the formwork wall panel 10 and an opposing second formwork wall panel 10*a*.

The brace coupling formation 18 defines a plurality of panel slot arrangements 24 operatively adapted to slidably engage either of two slider members 26, 27 of the wall panel coupling formation 20 of the brace 22. The slider members 26, 27 are connected on opposite sides of a brace panel 28 of the brace 22. The brace panel 28 includes concrete cavities 30 to facilitate concrete flow across the brace panel 28. As shown, the panel slot arrangements 24 include a first and second panel slot 32, 34 which are respectively adapted to slidably engage the first and second slider members 26, 27 of the wall panel coupling formation 20 of the brace 22.

The brace coupling formation 18 includes a first outer coupling member 36, a second outer coupling member 38 and a central coupling member 40 located between the first outer coupling member 36 and the second outer coupling member 38. The first outer coupling member 36, second outer coupling member 38 and central coupling member 40 extends outwardly from the operative inner surface 12 of the formwork wall panel 10. The first outer coupling member 36 and the central coupling member 40 define the first panel slot 32. The central coupling member 40 and the second outer coupling member 38 define the second panel slot 34.

Figure 6:
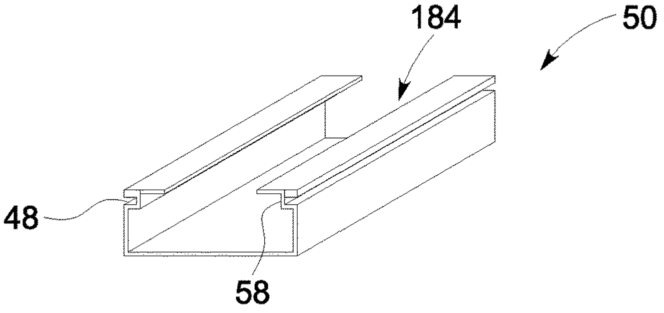
FIG. 6 is a schematic perspective view of an embodiment services channel for use in the formwork assembly of FIG. 5.

The first outer coupling member 36 includes (i) a first coupling member stem 42 which extends outwardly from the operative inner surface 12 of the formwork wall panel 10, and (ii) a transverse first coupling member flange 44 which extends towards the central coupling member 40. The outer coupling member stem 42 includes a transverse first outer coupling member rib 46 outwardly extending from the first coupling member stem 42 away from the central coupling member 40. In use the first outer coupling member rib 46 is adapted to engage a first slot 48 in a services channel 50, see FIG. 6, operatively located adjacent the operative inner surface 12 of the formwork wall panel 10.

The first coupling member flange 44 includes a transverse first coupling member lip 50 extending towards the operative inner surface 12 of the formwork wall panel 10. The purpose of the first coupling member lip 50 will become apparent from the below description.

The second outer coupling member 38 includes (i) a second coupling member stem 52 which extends outwardly from the operative inner surface 12 of the formwork wall panel 10, and (ii) a transverse second coupling member flange 54 which extends towards the central coupling member 40. The second outer coupling member stem 52 includes a transverse second outer coupling member rib 56 outwardly extending from the second coupling member stem 52 away from the central coupling member 40. In use the second outer coupling member rib 56 is adapted to engage a second slot 58 in the services channel 50 depicted in FIG. 6. In use the services channel 50 will enclose services conduits such as electrical cabling.

The second coupling member flange 54 includes a transverse second coupling member lip 60 extending towards the operative inner surface 12 of the formwork wall panel 10.

The central coupling member 40 includes (i) a central coupling member stem 62 which extends outwardly from the operative inner surface 12 of the formwork wall panel 10, and (ii) a transverse central coupling member flange 64. The central coupling member flange 64 includes at one end a transverse first lip 66 extending towards the operative inner surface 12 of the formwork wall panel 10. At an opposite second end the central coupling member flange 64 includes a transverse second lip 68 extending towards the operative inner surface 12 of the formwork wall panel 10.

The first panel slot 32 of the brace coupling formation 18 includes a first area 78 defined by the first coupling member stem 42, the first coupling member flange 44 and the first coupling member lip 50. The first panel slot 32 also includes a second area 80 defined by the central coupling stem 62, the central coupling member flange 64 and the transverse first lip 66. The second panel slot 34 of the brace coupling formation 18 includes a first area 82 defined by the second coupling member stem 52, the second coupling member flange 54 and the second coupling member lip 60. The second panel slot 34 also includes a second area 84 defined by the central coupling member stem 62, the central coupling member flange 64 and the second lip 68.

Referring to FIG. 4, the first slider member 26 includes a first slider stem 70 which extends outwardly from a slider connector 72. The slider connector 72 is transversely orientated relative to the brace panel 28 and attached to the brace panel 28. The second slider member 73 is attached to an opposite end of the slider connector 72. The first slider stem 70 is attached to a transverse first slider base 74. The first slider base 74 has two opposing first slider base lips 76.

Figure 5:
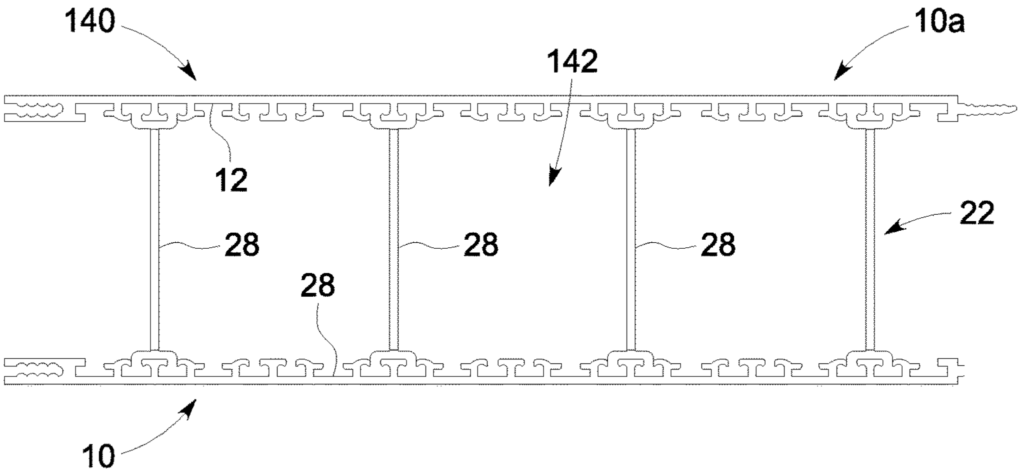
FIG. 5 is a schematic top view of an embodiment formwork assembly formed with the formwork wall panel of FIGS. 1 and 2 and the brace of FIGS. 3 and 4.

The first panel slot 32 defines a first space 86 formed between the first coupling member lip 50 of the first outer coupling member 36 and the first lip 66 of the central coupling member 40. The first space 86 is operatively adapted to allow the first slider stem 70 to pass therethrough. In use one the first slider base lips 76 is located in the first area 78 of the first panel slot 32 and the other first slider base lip 76 is located within the second area 82 of the first panel slot 32 as illustrated in FIG. 5.

The second slider member 27 includes a second slider stem 90 which extends outwardly from the slider connector 72. The second slider stem 90 is attached to a transverse second slider base 92. The second slider base 92 has two opposing second slider base lips 94 outwardly extending from the second slider base 92.

The second panel slot 34 includes a first space 96 formed between the second coupling member lip 60 of the second outer coupling member 38 and the second lip 68 of the central coupling member 40. The first space 96 is adapted to allow the second slider stem 90 to pass therethrough.

The second panel slot 34 includes (i) a first area 98 defined by the second coupling member stem 52, the second coupling member flange 54 and the second coupling member lip 60, and (ii) a second area 100 defined by the central coupling member stem 62, the transverse central coupling member flange 64 and the second lip 68. In use one of the slider base lips 94 of the second slider member 27 is located in the first area 98 of the second panel slot 27 and the other slider base lip 94 of the second slider member 27 is located within the second area 100 of the second panel slot 34.

The formwork wall panel 10 at one end includes a first joining formation 102 and at a second opposite end a second joining formation 104. The first and second joining formations 100, 102 are operatively adapted to join the formwork wall panel 10 to two adjacent, non-illustrated formwork wall panels located on opposite sides of the formwork wall panel 10.

The first joining formation 102 includes a first joining stem 106 outwardly extending from the operative inner surface 12 of the formwork wall panel 10 and a transverse male member 108 outwardly extending from one side of the first joining stem 106. The first joining stem 106 includes a first transverse joining rib 110 extending outwardly in a direction opposite to the male member 108. The operative inner surface 12, the first joining stem 106 and the transverse joining rib 110 define a first flange opening 112 for slidably receiving a first flange 114 of a panel joining member 116 shown in FIG. 7.

The second joining formation 104 includes a second joining stem 118 outwardly extending from the operative inner surface 12 of the formwork wall panel 10 and a transverse female member 120 outwardly extending from one side of the second joining stem 118. The second joining stem 118 includes a second transverse joining rib 122 extending outwardly in a direction opposite to the female member 120. The operative inner surface 12, the second joining stem 118 and the second transverse joining rib 122 defines a second flange opening 124 for slidably receiving a second flange 126 of another panel joining member 116 as shown in FIG. 7.

The male member 108 of the formwork wall panel 10 is operatively adapted to be received and held by the female member 120 of a non-illustrated adjacent formwork wall panel. The male member 108 includes a male gripping formation 128 operatively associated with a complemental female gripping formation 130 of the female member 120.

The male gripping formation 128 is provided in the form of male teeth operatively adapted to engage female gripping teeth providing the female gripping formation 130.

Figure 7:
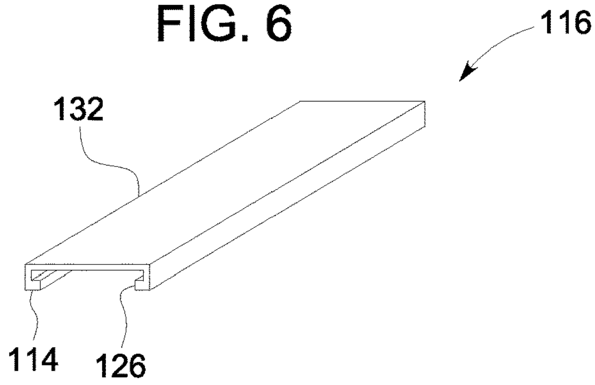
FIG. 7 is a schematic perspective view of an embodiment panel joining member.

Referring to FIG. 7, the panel joining member 116 includes a base 132. The base 132 will in use extend across a coupled male and female member 108, 120 to locate the first and second flanges 114, 126 within the first and second flanges openings 112, 124 of adjacent formwork wall panels 10. In effect the panel joining member 116 secures coupling between the male and female member 108, 120 and deters the ingress of moisture through the joint between adjoining formwork wall panels 10.

Figure 8:
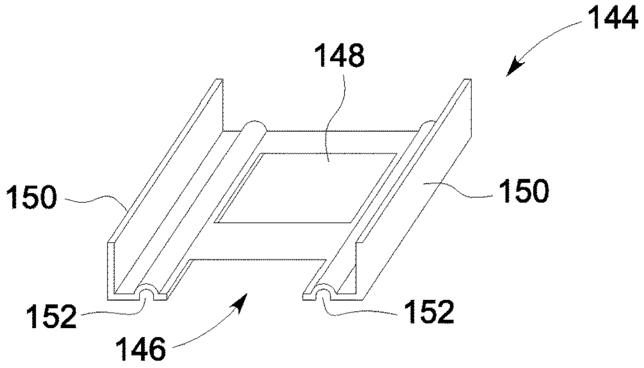
FIG. 8 is a schematic perspective view of an embodiment formwork base member.

FIG. 5 shows a formwork assembly 140 which includes a first formwork wall panel 10 operatively associated with an opposing, spaced apart second formwork wall panel **10*a*. The operative opposing inner surfaces 12 of formwork wall panels define a cavity 142 to be filed with poured concrete. The formwork assembly 140 is supported by a formwork base member 144, shown in FIG. 8. The formwork base member 144 includes a central spine 146 having concrete openings 148. The formwork base member 144 includes two opposing support walls 150 to engage opposing formwork wall panels 10 of the formwork assembly to maintain the formwork assembly 140 in an upright orientation. The central spine 146 includes 2 parallel hollow ridges 152** through which non-illustrated reinforcing components can pass.

Figure 9:
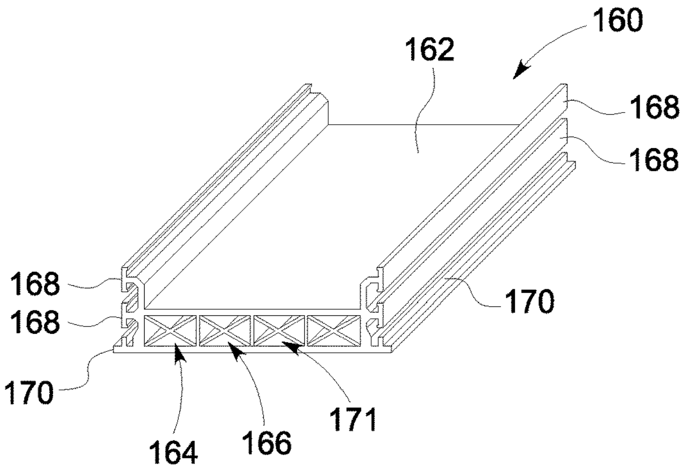
FIG. 9 is a schematic perspective view of an embodiment end cap member.

FIG. 9 shows a portion of an embodiment end cap member 160. The end cap member 160 includes an operative inner and an operative outer panel 162, 164 having a reinforcing formation 166 sandwiched between the inner and outer panels 162, 164. The end cap member 160 includes a number of slider members 168. The slider members 168 are operatively adapted to engage the brace coupling formation 18 of two opposing formwork wall panels in the same manner that the wall panel coupling formation 20 of the brace 22 engage the brace coupling formation 18 described above. The end cap member 160 further includes projections 170 operatively adapted to be slidably received within slots 172, 174, shown in FIG. 2, defined respectively between (i) the first outer coupling member rib 46 and the operative inner surface 12 and (ii) the second outer coupling member 56 and the operative inner surface 12. The end cap member 160 includes reinforcing 171 to strengthen the end cap member 160 against the weight of concrete working against it during use.

Figure 10:
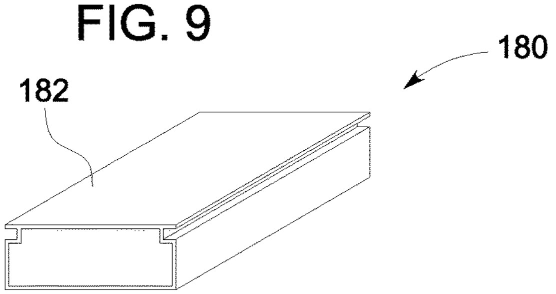
FIG. 10 is a schematic perspective view of a second embodiment services channel.

FIG. 10 shows a second embodiment services channel 180. The second embodiment services channel 180 has a closed side wall 182 as opposed to an open side wall 184 of the services channel 50 depicted in FIG. 6.

Figure 11:
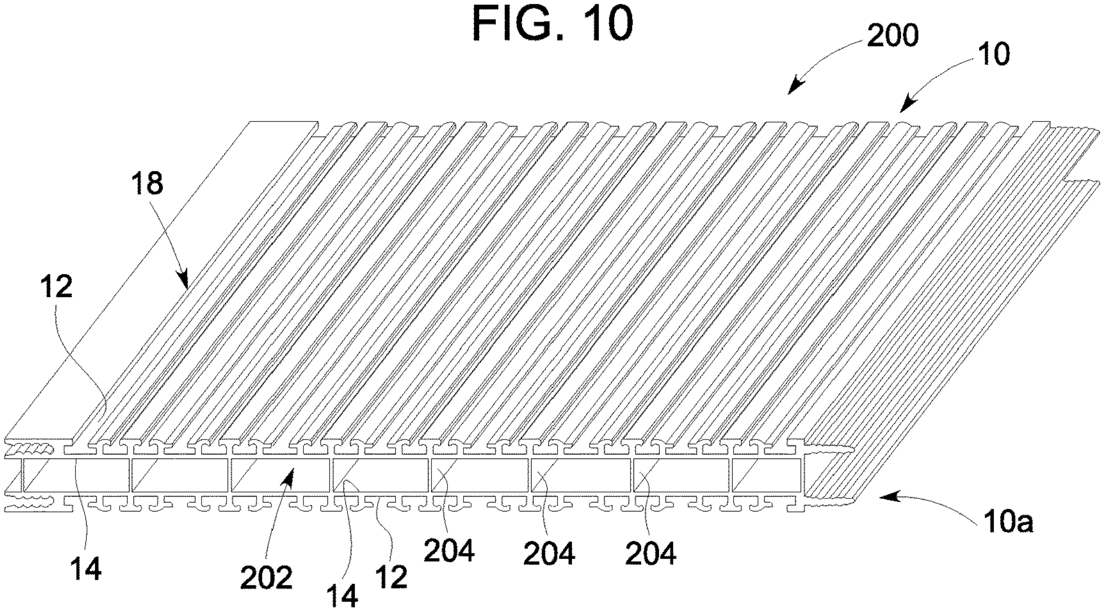
FIG. 11 is a schematic perspective view of an embodiment formwork cavity panel.
Figure 12:
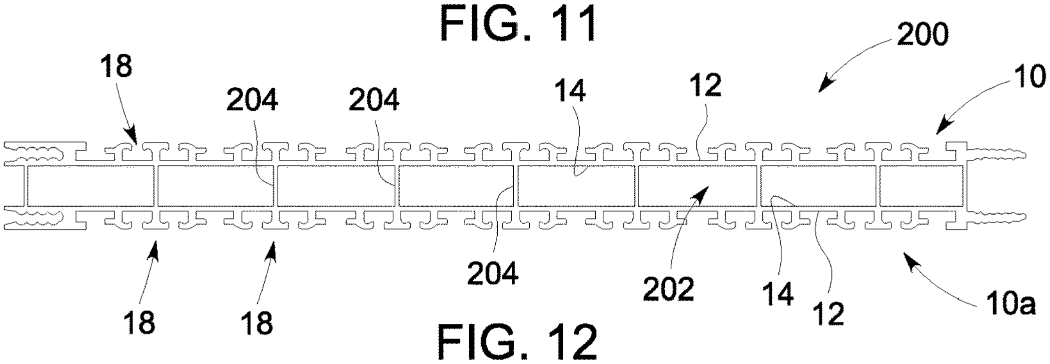
FIG. 12 is a schematic top view of the formwork cavity panel of FIG. 11.

FIG. 11 shows an embodiment formwork cavity panel, generally indicated with the reference numeral 200. The formwork cavity panel 200 includes a first embodiment formwork wall panel 10 as described above. As above, the formwork wall panel 10 includes an operative inner surface 12, to face towards a first inner space to be filed with building material, and an opposing operative outer surface 14. The operative inner surface 12 of the formwork wall panel 10 includes a brace coupling formation 18 operatively adapted to engage a non-illustrated wall panel coupling formation of a brace operatively extending between the first formwork wall panel 10 and a non-illustrated opposing formwork wall panel. The formwork cavity panel 200 includes a second formwork wall panel **10*a*, configured as described above. The formwork wall panel 10*a* includes an operative inner surface 12, to face towards an inner space to be filed with building material, and an opposing operative outer surface 14. The operative inner surface 12 of the second formwork wall panel 10*a* includes a brace coupling formation 18 operatively adapted to engage a wall panel coupling formation of a non-illustrated brace operatively extending between the second formwork wall panel 10*a*** and a non-illustrated opposing formwork wall panel.

The outer surface 14 of the first formwork wall panel 10 is spaced apart from the outer surface 14 of the second formwork wall panel **10*a* to form an insulation space 202. The first formwork wall panel 10 is secured to the second formwork wall panel 10*a* via spacer connectors 204 which extend across the insulation space 202. In use the insulation space 202 is not filled with building material to provide insulation between the first formwork wall panel 10 and the second formwork wall panel 10*a***.

Figure 13:
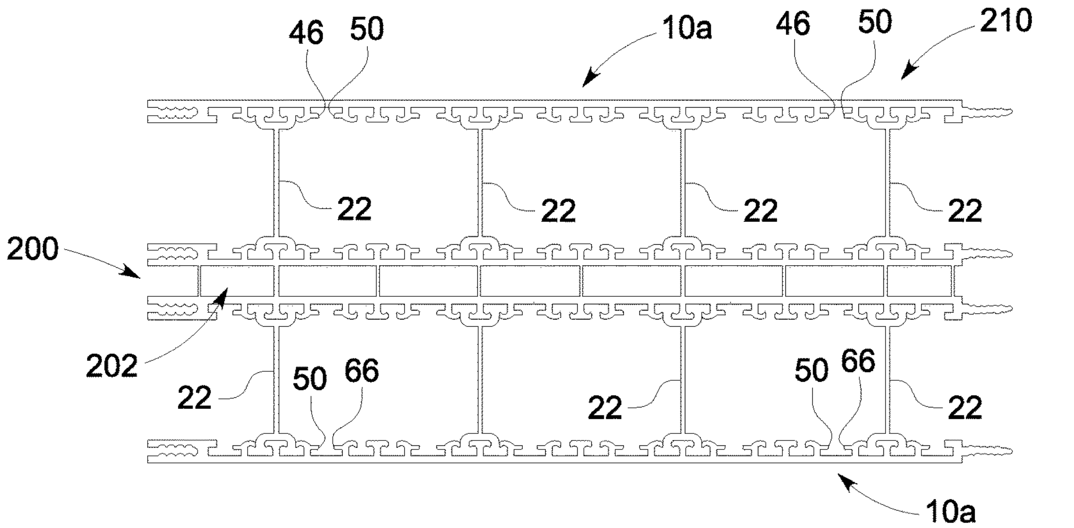
FIG. 13 is a schematic top view of a second embodiment formwork assembly.

FIG. 13 show a formwork assembly 210 utilizing an embodiment formwork cavity panel 200. The formwork cavity panel 200 is sandwiched between formwork wall panels **10*a* via braces 22**.

Figure 14:
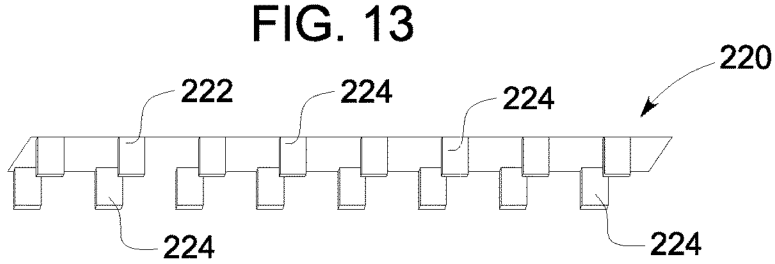
FIG. 14 is a schematic perspective view of an embodiment of a cavity closure for use with the formwork cavity panel of FIG. 11.

FIG. 14 shows an embodiment cavity closure 220 operatively associated with the formwork cavity panel 200 of FIG. 13. The cavity closure 220 includes a closure base 222 having a plurality of closure projections 224 outwardly extending from the closure base 222. The closure projections 224 are operatively adapted to be slidingly received between opposing first and second outer coupling member ribs 46, 56 of the formwork cavity panel 200. With the cavity closure 220 coupled to the formwork cavity panel 200 the closure base 222 will prevent building material from filling the insulation space 202 during a concrete pour process.

Figure 15:
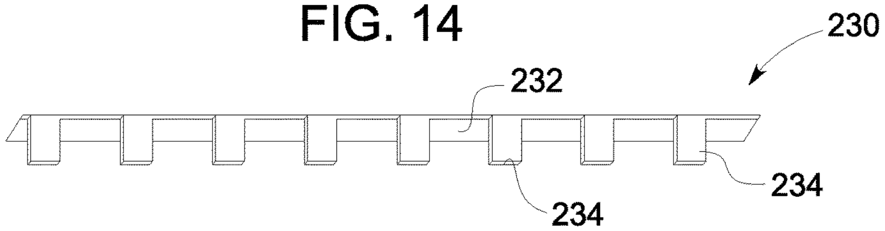
FIG. 15 is a schematic perspective view of an embodiment edge closure.

FIG. 15 shows an embodiment edge closure 230 operatively associated with the formwork cavity panel 200 of FIG. 13. The edge closure 230 includes a closure base 232 having a plurality of closure projections 234 outwardly extending from the closure base 232. The closure projections 234 are operatively adapted to be slidingly received between opposing first and second outer coupling member ribs 46, 56 of the formwork cavity panel 200.

Figure 16:
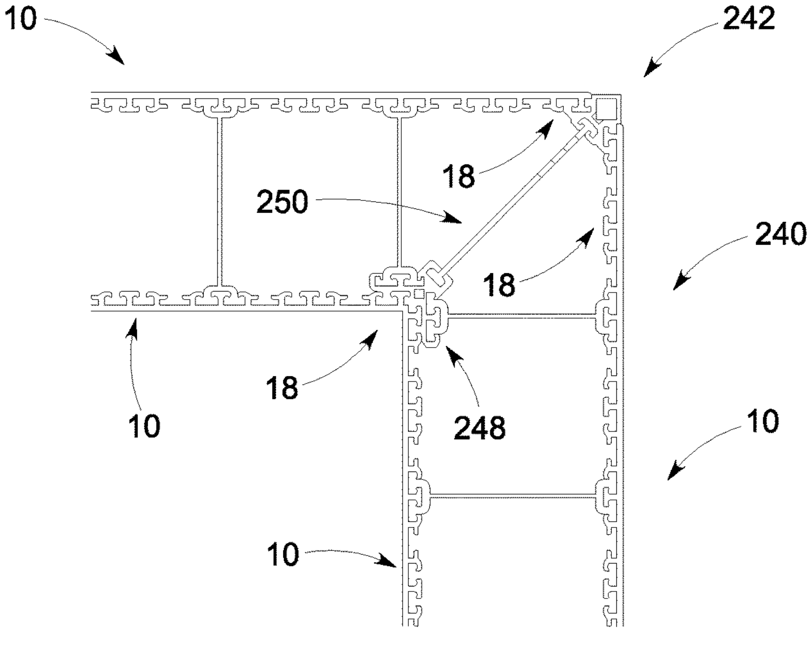
FIG. 16 is a schematic top view of a third embodiment formwork assembly.
Figure 17:
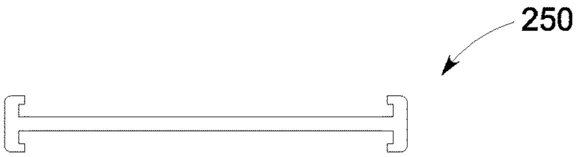
FIG. 17 is a schematic top view of a corner brace.
Figure 18:
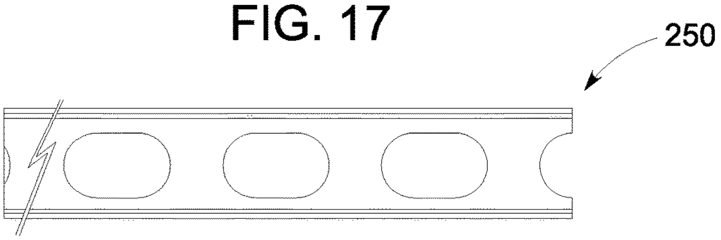
FIG. 18 is a schematic side view of the corner brace of FIG. 17.
Figure 19:
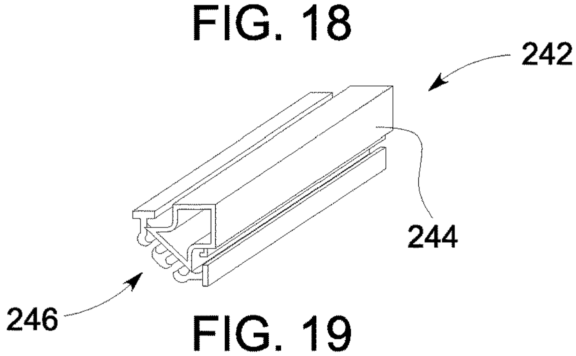
FIG. 19 is a schematic perspective view of an embodiment corner connector.
Figure 20:
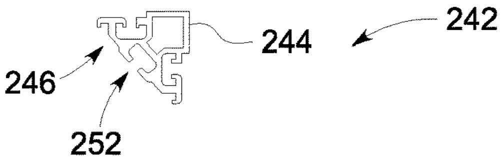
FIG. 20 is a schematic end view of the corner connector of FIG. 19.

FIG. 16 shows a corner of a formwork assembly 240 including a plurality of opposing formwork wall panels 10. The formwork assembly 240 includes a corner adapter 242, shown in FIGS. 19 and 20, for securing the two outer formwork wall panels 10 at right angles. The corner adapter 242 includes a corner closure member 244 as well as an adapter coupling formation 246 operatively adapted to engage the brace coupling formations 18 of two adjacent formwork wall panels 10. The formwork assembly 40 includes a further corner adapter 248 for securing the two inner formwork wall panels 10 at right angles. The corner adapters 242, 248 are connected via a corner brace 250, shaped as shown in FIGS. 17 and 18, which is adapted to be slidingly received within adapter slots 252.

Figure 21:
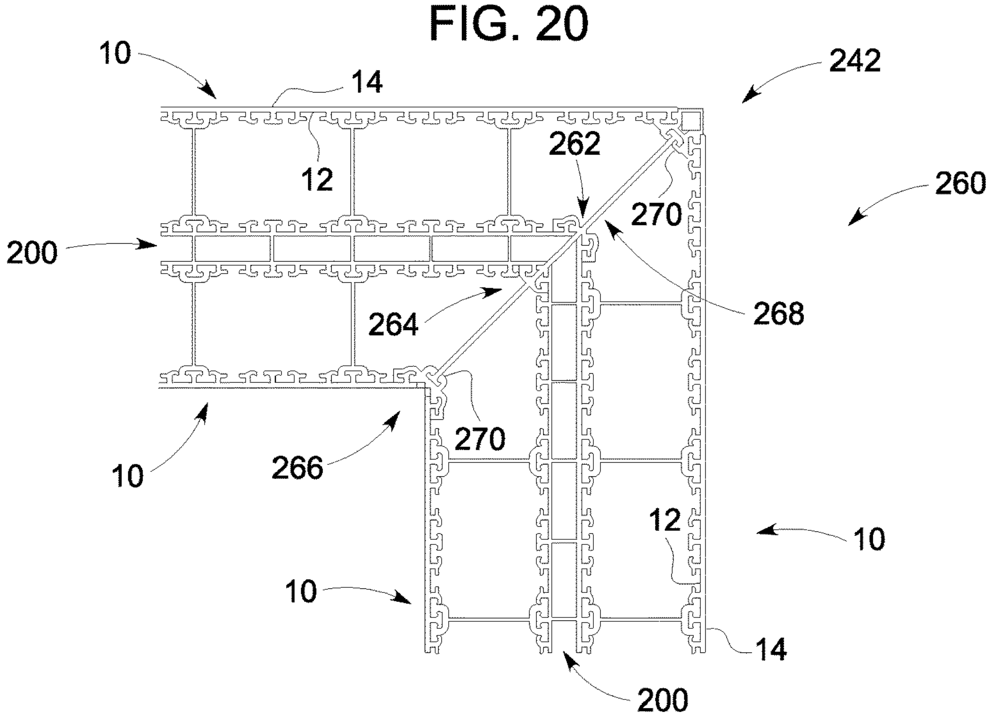
FIG. 21 is a schematic top view of a fourth embodiment formwork assembly.

FIG. 21 shows a corner of another embodiment formwork assembly 260 including a plurality of formwork wall panels 10 which enclose embodiment formwork cavity panels 200. The formwork assembly 260 includes the corner adapter 242 of FIGS. 19 and 20. The formwork assembly 260 includes further corner adapters 262, 264, 266 for securing wall panels 10 and formwork cavity panels 200 at right angles as shown. The corner adapters 242, 262, 264, 266 are connected via a corner brace 268 which is adapted to be slidingly received within adapter slots 270.

Figure 22:
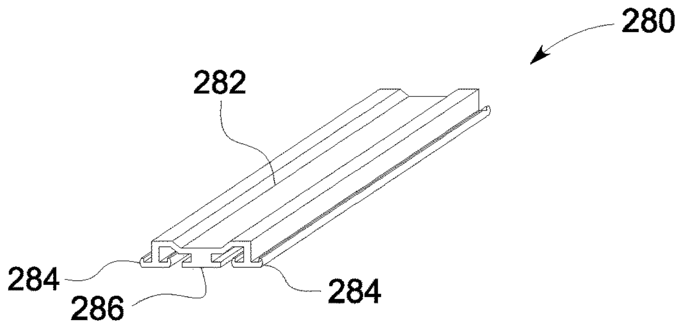
FIG. 22 is a schematic perspective view of an embodiment joining member.
Figure 23:
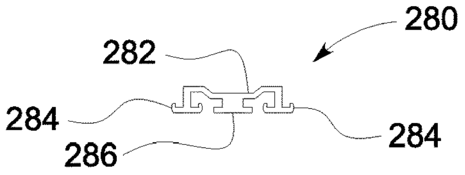
FIG. 23 is a schematic end view of the joining member of FIG. 22.

FIGS. 22 and 23 show an embodiment joining member 280 for coupling adjoining formwork wall panels 10. The joining member 280 includes a joining member base 282 having outwardly extending joining sliding members 284 and a central sliding member 286. The joining sliding members 284 are operatively adapted to slidingly engage brace coupling formations 18 of two adjacent formwork wall panels 10. The central sliding member 286 is configured to be slidingly received within a slot defined by the outer coupling member ribs 46, 56 of two adjacent formwork wall panels 10.

Figure 24:
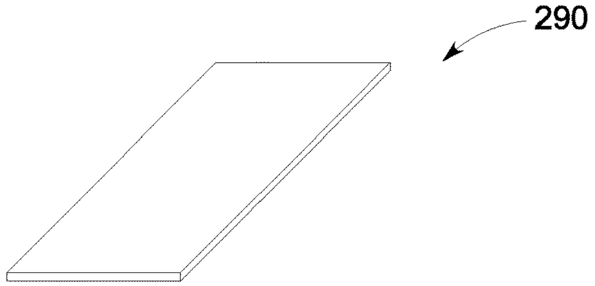
FIG. 24 is a schematic perspective view of a second embodiment joining member.

FIG. 24 show an embodiment planar joining member 290. The joining member 290 is sized to be slidingly received within a non-illustrated slot defined by the outer coupling member ribs 46, 56 of two adjacent formwork wall panels 10.

Figure 25:
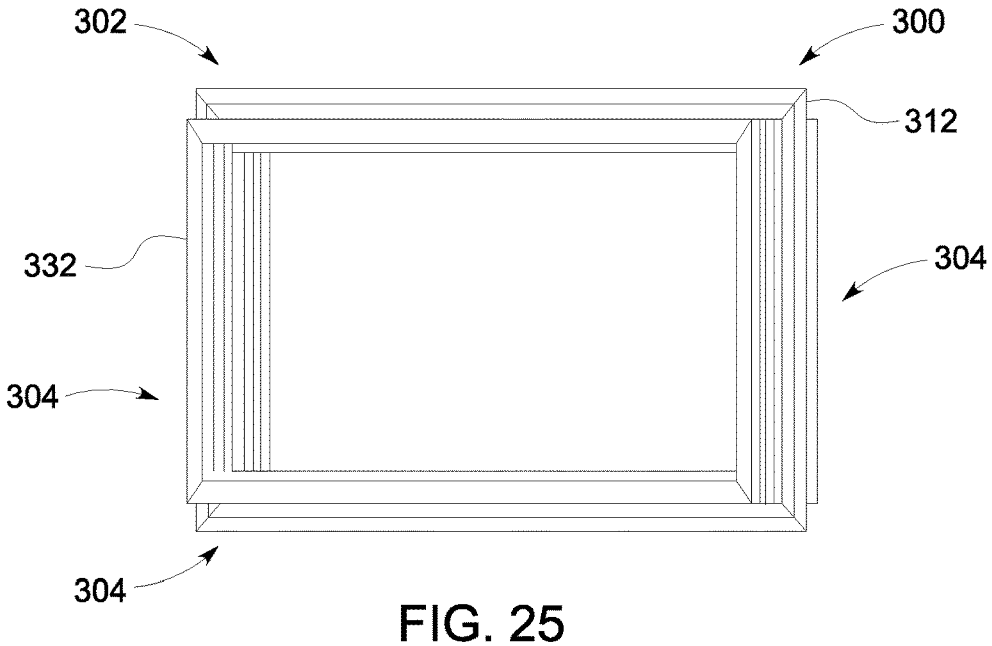
FIG. 25 is a schematic perspective view of an embodiment window frame assembly.

FIG. 25 shows an embodiment window frame assembly, generally indicated with the reference numeral 300. The window frame assembly includes an operative upper window frame member 302, shown in FIG. 26, and three window frame members 304, shown in FIG. 27. The window frame members 302, 304 are adapted for operative location within a non-illustrated window cavity of a wall. Each window frame member 302, 304 includes a window cavity side 306, operatively facing a wall within which the window frame members 302, 304 are placed, and (ii) a window side 308, operatively facing a window pane held by the window frame members 302, 304. The window frame members 302, 304 include a plurality of window frame tracks 310 operatively adapted to be engaged by an elongate cavity member 312, shown in FIG. 28. In use the cavity member 312 will extend into a wall cavity of the wall to hold a respective window frame member 302, 304 in position and as a result secure the window frame assembly 300 in position.

Each window frame track 310 includes a track stem 314, outwardly extending from its window cavity side 306, and a transverse track member 316. The cavity member 312 defines a track slot 318 which is complemental to the shape of the window frame tracks 310 and is adapted to slidably receive a single window track 310. By providing a plurality of window frame tracks 310 the position of the cavity member 312 on the window frame members 302, 304 can be adjusted to accommodate differently positioned wall cavities of different walls.

The window frame members 302, 304 each includes a window attachment member 320 outwardly extending from the window side 38 of the window frame members 302, 304. In use a non-illustrated window pane will be secured to the window attachment member with suitable fasteners.

Figure 26:
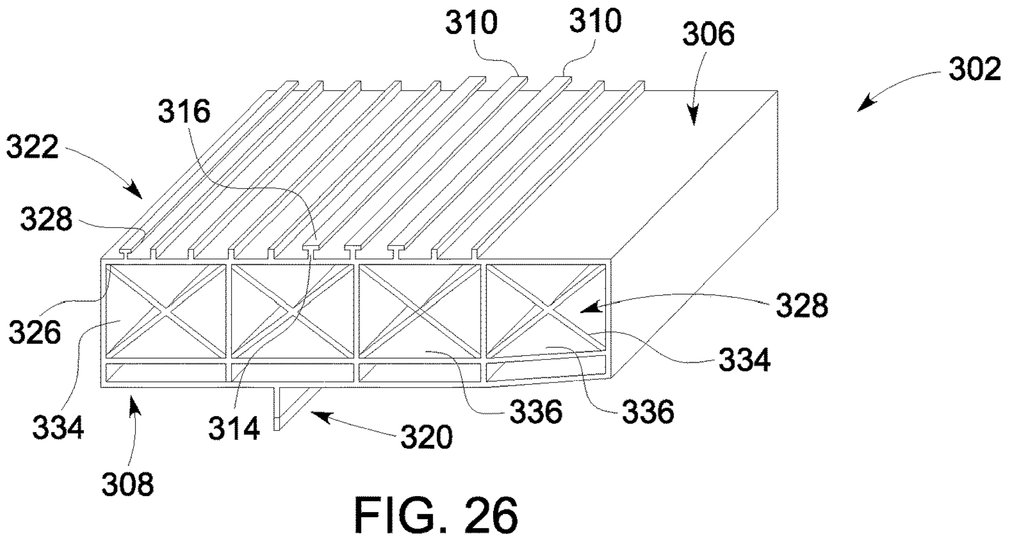
FIG. 26 is a schematic perspective view of a portion of a first embodiment window frame member of the window frame assembly of FIG. 25.
Figure 27:
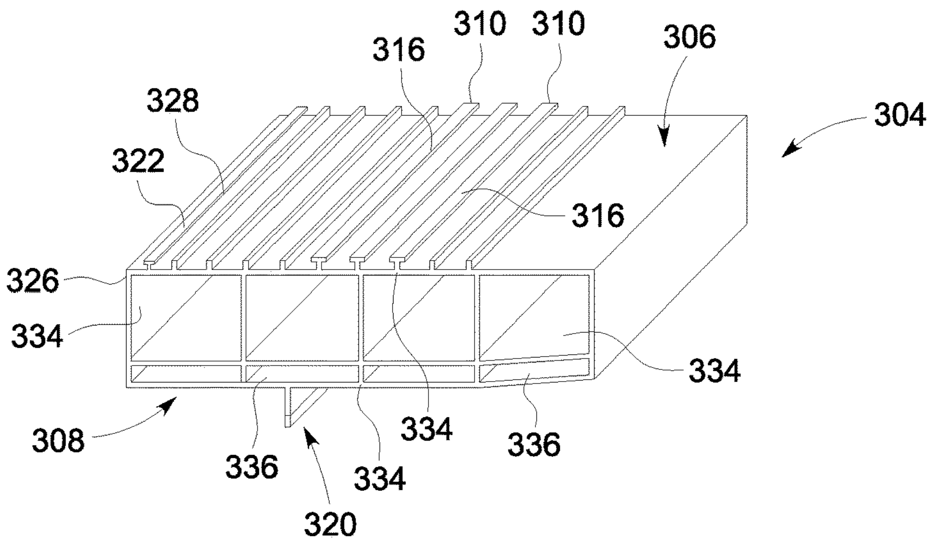
FIG. 27 is a schematic perspective view of a portion of a second embodiment window frame member of the window frame assembly of FIG. 25.
Figure 28:
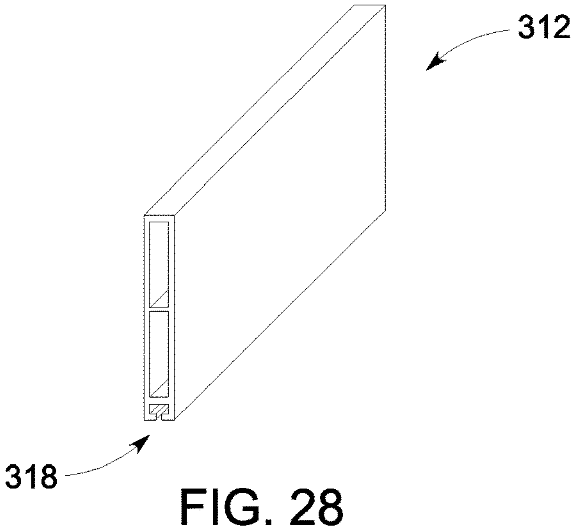
FIG. 28 is a schematic perspective view of a portion of a cavity member of the window frame assembly of FIG. 25.
Figure 29:
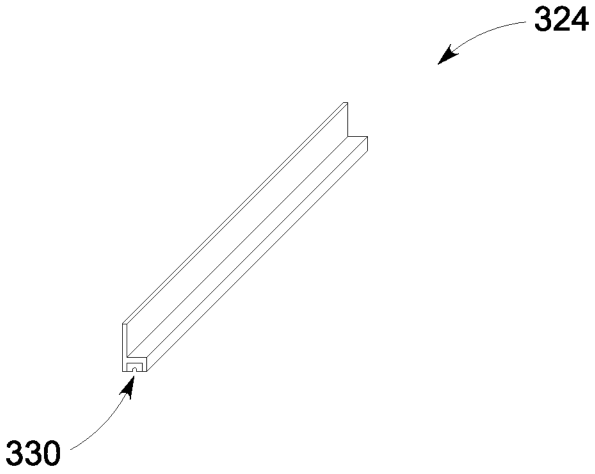
FIG. 29 is a schematic perspective view of a shadow bar of the window frame assembly of FIG. 25.
Figure 30:
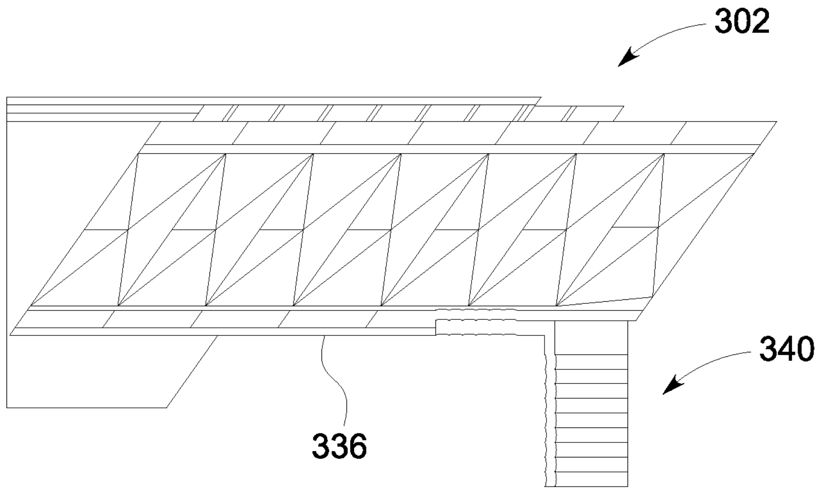
FIG. 30 is a schematic perspective view of a portion of the window frame member of FIG. 30 and an embodiment stiffener.
Figure 31:
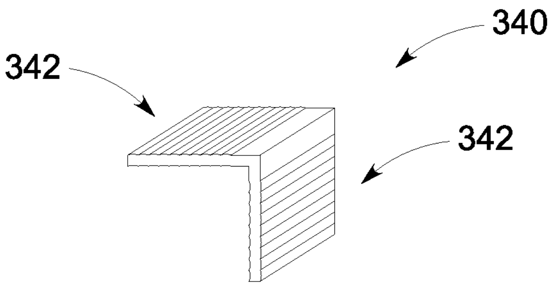
FIG. 31 is a schematic perspective view of the stiffener of FIG. 29.

As shown in FIGS. 26 and 27 the window frame members 302, 304 include shadow line bar tracks 322 operatively adapted to engage a shadow line bar 324. In this embodiment the window frame members 302, 304 include a plurality of shadow line bar tracks 322 to provide for alternative positioning of the shadow line bar 324. In this embodiment the shadow line bar tracks 322 each include a shadow line track stem 326 and a transverse shadow line track member 328. The shadow line bare 324 defines a track cavity 330 configured to slidably receive a shadow line bar track 322. An assembled shadow line 332 is shown in FIG. 25. The shadow line 332 serves to provide an aesthetically pleasing finish to the window frame assembly 300.

Each window frame member 302, 304 includes a plurality of longitudinally extending support channels 334, 336 for strengthening the window frame members 302, 304. The operative upper window frame member 302 will take the place of a lintel and for this reason a window frame bracing formation 338 is provided for additional strength within its support channels 334.

Furthermore, stiffeners 340 are provided for location within the support channels 336 of the window frame members 302, 304. The stiffeners 340 include teeth 342 as shown. In use the stiffeners 340 not only provide added strength, they will also deter the ingress of moisture.

The embodiment window assembly 300 allows a builder to install a window pane towards the end of the construction process. This will avoid damage to the window pane and also reduce the amount of building dirt accumulating on the window panel during the building process.

Figure 32:
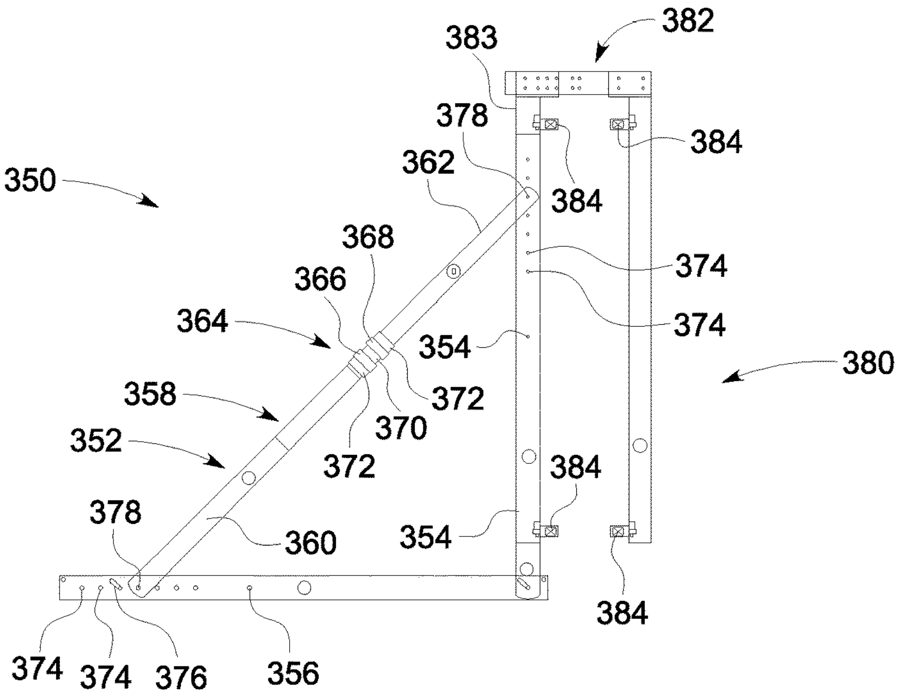
FIG. 32 is a schematic side view of an embodiment wall support assembly.

FIG. 32 shows an embodiment wall support assembly 350 operatively adapted to support non-illustrated formwork to be filled with concrete. The wall support assembly 350 includes a wall brace assembly 352. The wall brace assembly 352 includes a wall brace upright 354 and a wall brace base 356. The wall brace assembly 352 further includes a cross-brace 358 extending between the wall brace upright 354 and the wall brace base 356. The cross-brace 358 includes an outer brace member 360 and an inner brace member 362 which are telescopically coupled to adjust the length of the cross-brace 358.

The cross-brace 358 includes an adjustment configuration 364 for adjusting the length of the cross-brace 358. The adjustment configuration 364 includes an outwardly extending pin 366 on the inner brace member 362 operatively located within an elongate slot 368 of the outer brace member 360. The outer brace member 360 includes an outer threaded portion 370. The threaded portion 370 includes threaded adjustment members 372 operatively adapted to engage the pin 366 so to adjust the cross-brace 358 to a desired length by telescopically moving the outer and inner brace members 360, 362.

The wall brace upright 354 and wall brace base 356 include adjustment holes 374 that enable adjustment of the position of the cross-brace 358. In a new position the cross-brace 358 is secured in place with suitable fasteners

376 which pass through the adjustment holes 374 and brace holes 378 of the cross-brace 358.

The wall support assembly 350 includes an upright 380 laterally spaced apart from the wall brace upright 354. As shown, the wall brace upright 354 is telescopically coupled to the upright 358 via a cross-member 382 so that the distance between the wall brace upright 354 and the upright 380 can be adjusted subject to the thickness of the formwork wall to be supported. The cross-member 382 includes a sleeve 383 which slidingly receives an upper portion of the wall brace upright 354. The wall brace upright 354 and the upright 360 include two sets of elongate, parallel co-extensive support beams 384 to support outer surfaces of the walls of a non-illustrated formwork assembly.

Figure 33:
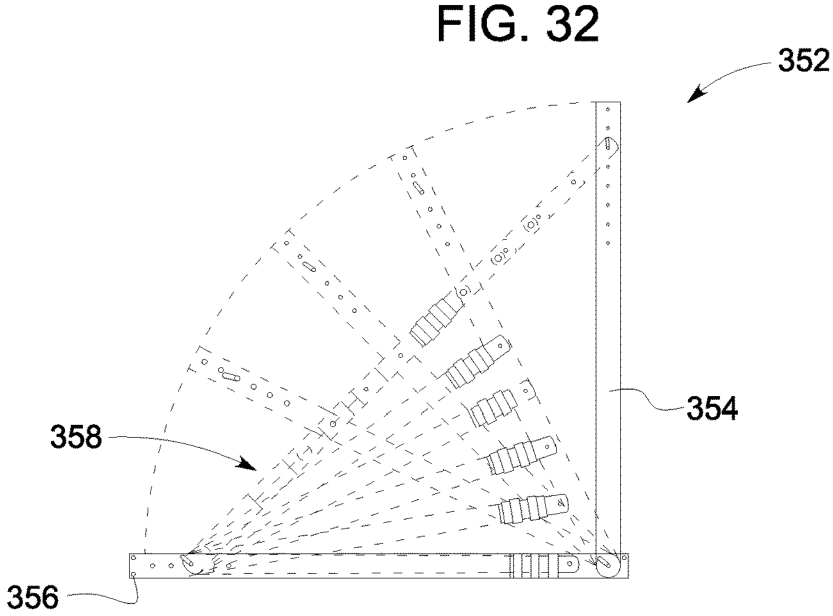
FIG. 33 is a side view of an embodiment wall brace assembly of the wall support assembly of FIG. 32 being collapsed/erected.
Figure 34:
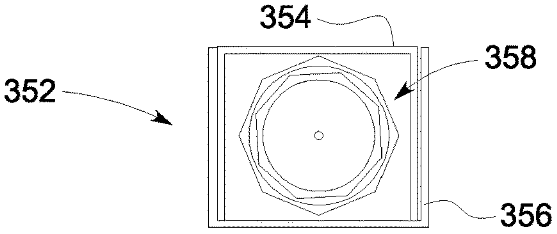
FIG. 34 is a schematic side view of the wall brace assembly of FIG. 33 in a collapsed condition.
Figure 35:
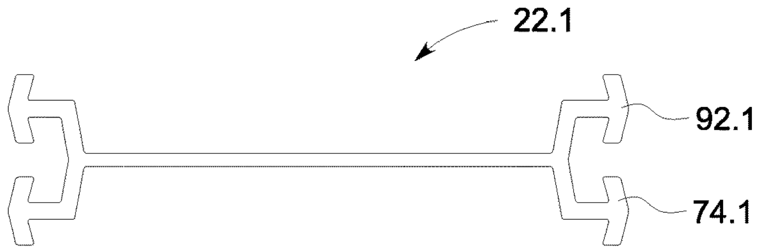
FIG. 35 is a schematic top view of another embodiment brace.

FIGS. 33 and 34 illustrate that the wall brace assembly 352 is collapsible. Specifically, the wall brace upright 354 and the cross-brace 354 are sized so that when the brace assembly 352 is collapsed, the wall brace upright 354 and the cross-brace 358 fit within the wall brace base 356. Such feature enables ease of transport to and from building sites.

It is envisaged that embodiment formwork wall panels could be produced from a range of different materials.

Figure 36:
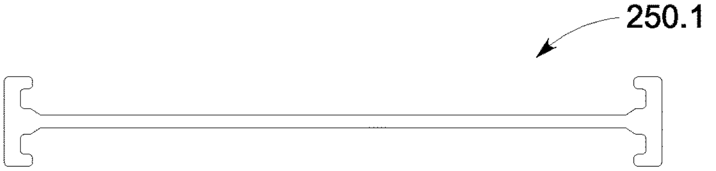
FIG. 36 is a schematic top view of another embodiment corner brace.
Figure 37:
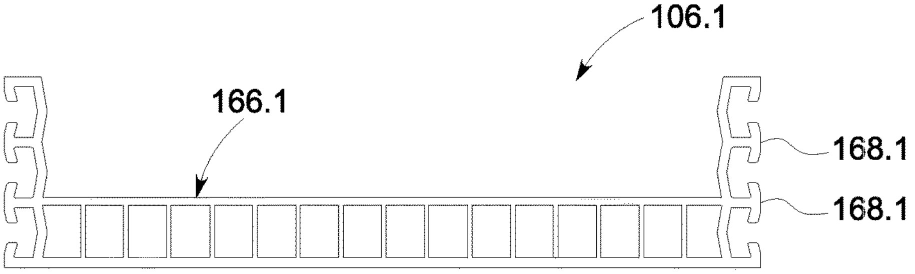
FIG. 37 is a schematic top view of another embodiment end cap member.
Figure 38:
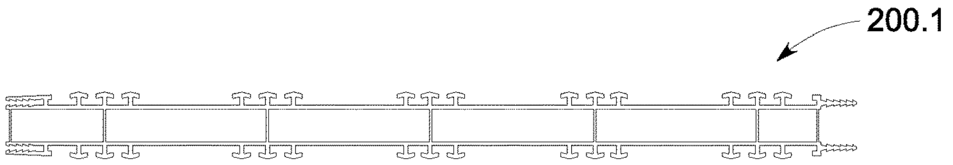
FIG. 38 is a schematic top view of another embodiment end cap member.
Figure 39:
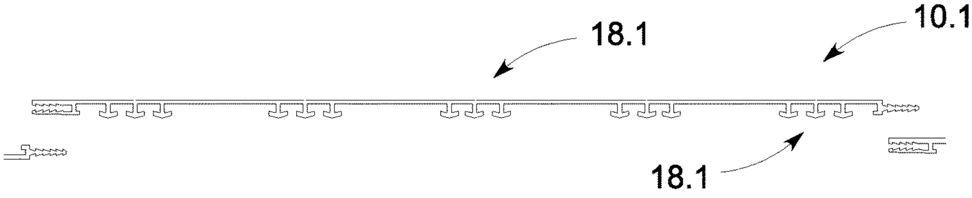
FIG. 39 is schematic top view of another embodiment formwork wall panel.
Figure 40:
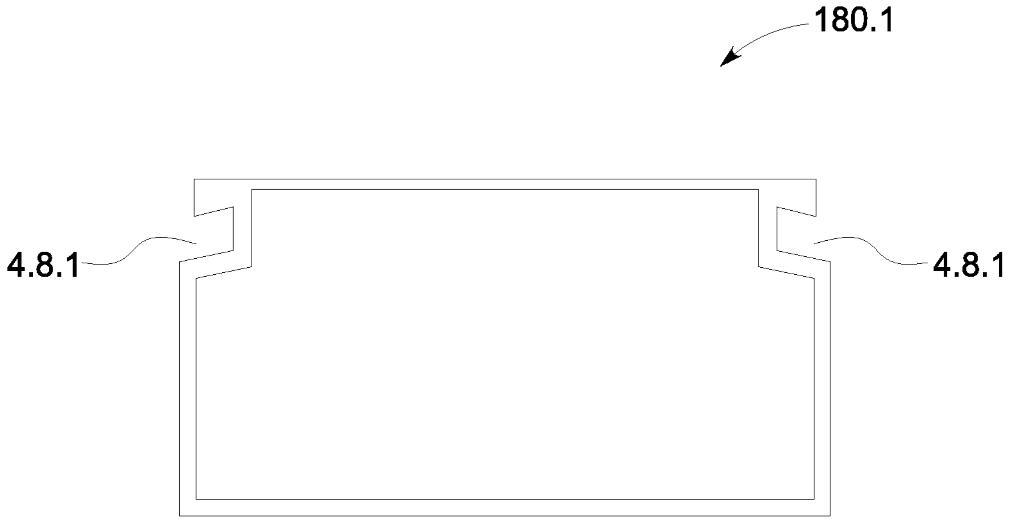
FIG. 40 is a schematic end view of another embodiment services channel.
Figure 41:
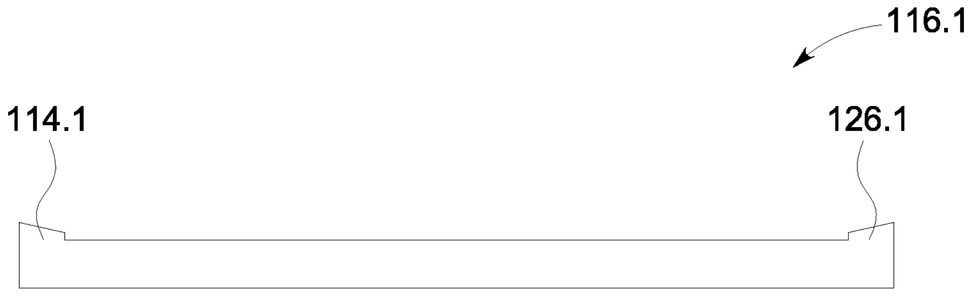
FIG. 41 is a schematic end view of another embodiment panel joining member.

It will be appreciated that the formwork assembly described above could be employed in a variety of shapes without departing from the spirit of the invention. A number of such variations are depicted in FIG. 35 to FIG. 41. FIG. 34 shows an embodiment brace 22.1 having slider members 74.1 and 92.1 which are substantially arrow-shaped, but which operates in a manner similar to the brace 22 described above. FIG. 36 shows a corner brace 250.1 which operated in a manner similar to the corner brace 250 described above. FIG. 37 depicts another embodiment end cap 106.1 having slider members 168.1 shaped to engage a complementally shaped brace coupling formation. FIG. 38 shows an embodiment formwork cavity panel 200.1 having brace coupling formations 18.1 operatively adapted to be coupled with the brace 22.1 in a manner as described above. FIG. 39 shows a formwork wall panel 10.1 similar to the formwork wall panel 10 as described above, but having a brace coupling formation 18.1 adapted to coupled with the brace 22.1. FIG. 40 shows another embodiment services channel 180.1 having slots 48.1 which are adapted to co-operate with the brace coupling formation 18.1 in a manner as previously discussed. Finally FIG. 41 shows another embodiment panel joining member 116.1 having flanges 114.1 and 126.1 to engage the brace coupling formation 18.1 in the manner and for the purpose described above.

Although the invention is described above in relation to preferred embodiments, it will be appreciated by those skilled in the art that it is not limited to those embodiments, but may be embodied in many other forms.

What is claimed is:

1. A formwork cavity panel including:

a first formwork wall panel having an operative inner surface, to face towards a first inner space to be filled with building material, and an opposing first operative outer surface facing away from the first inner space, wherein (i) the operative inner surface of the first formwork wall panel includes a first brace coupling formation operatively adapted to engage a first wall panel coupling formation of a first brace operatively extending between the first formwork wall panel and a first opposing formwork wall panel opposing the first formwork wall panel; and a second formwork wall panel having an operative inner surface, to face towards a second inner space to be filled with the building material, and an opposing second operative outer surface facing away from the second inner space, wherein (i) the operative inner surface of the second formwork wall panel includes a brace coupling formation operatively adapted to engage a wall panel coupling formation of a brace operatively extending between the second formwork wall panel and a second opposing formwork wall panel opposing the second formwork wall panel;

wherein the first outer surface of the first formwork wall panel is laterally spaced apart from the second outer surface of the second formwork wall panel to form an insulation space, the first formwork wall panel being secured to the second formwork wall panel via spacer connectors which extend across the insulation space, in use the insulation space providing insulation between the building material within the first inner space and the building material within the second inner space;

wherein the first brace coupling formation includes a first outer coupling member, a second outer coupling member and a central coupling member located between the first outer coupling member and the second outer coupling member, the first outer coupling member, the second outer coupling member and the central coupling member extending outwardly from the operative inner surface of the first formwork wall panel;

wherein the central coupling member includes (i) a central coupling member stem which extends outwardly from the operative inner surface of the first formwork wall panel, and (ii) a transverse central coupling member flange;

wherein the first wall panel coupling formation includes a first slider member and a second slider member with the first slider member and the second slider member being connected on opposing sides of a transverse slider connector;

wherein the first brace coupling formation defines a panel slot arrangement operatively adapted to slidably engage one of the first wall panel coupling formation first slider member and the first wall panel coupling formation second slider member with the panel slot arrangement including a first panel slot and a second panel slot respectively adapted to slidably engage one of the first wall panel coupling formation first slider member and the first wall panel coupling formation second slider member;

wherein one of the first wall panel coupling formation first slider member and the first wall panel coupling formation second slider member is connected to a brace panel of the first brace with the brace panel including concrete cavities to facilitate concrete flow across the brace panel;

wherein (i) the first outer coupling member and the central coupling member define the first panel slot and (ii) the central coupling member and the second outer coupling member define the second panel slot;

wherein the first outer coupling member stem includes a transverse first outer coupling member rib outwardly extending from the first coupling member stem away from the central coupling member; and wherein the second outer coupling member stem includes a transverse second outer coupling member rib outwardly extending from the second coupling member stem away from the central coupling member.

* * * * *